(12) United States Patent
Jannasch et al.

(10) Patent No.: US 6,465,126 B1
(45) Date of Patent: Oct. 15, 2002

(54) BINDER AND/OR ELECTROLYTE MATERIAL

(75) Inventors: Patric Jannasch, Lund; Anna-Karin Hjelm, Nacka, both of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 36 days.

(21) Appl. No.: 09/593,041

(22) Filed: Jun. 13, 2000

(30) Foreign Application Priority Data

Jun. 14, 1999 (SE) ................................. 9902233

(51) Int. Cl.⁷ .......................... H01M 4/62; H01M 10/40
(52) U.S. Cl. ...................... 429/217; 429/317; 521/25; 521/34
(58) Field of Search ................. 429/217, 317; 521/25, 34

(56) References Cited

U.S. PATENT DOCUMENTS

| | | | | |
|---|---|---|---|---|
| 4,908,283 A | * | 3/1990 | Takahashi et al. | 429/217 X |
| 4,925,752 A | * | 5/1990 | Fauteux et al. | 429/217 X |
| 4,970,012 A | * | 11/1990 | Kuroda et al. | 429/317 X |
| 5,001,023 A | * | 3/1991 | Cheshire et al. | 429/317 X |
| 5,378,560 A | | 1/1995 | Tomiyama | 429/217 |
| 5,436,090 A | * | 7/1995 | Kono et al. | 429/317 |
| 5,443,601 A | | 8/1995 | Doeff et al. | 29/623.5 |
| 5,773,166 A | * | 6/1998 | Matsui et al. | 429/212 |
| 5,891,593 A | | 4/1999 | Keller et al. | 429/217 |
| 5,972,056 A | * | 10/1999 | Brikez | 429/217 X |

FOREIGN PATENT DOCUMENTS

WO  WO 88/03154  5/1988

* cited by examiner

Primary Examiner—Stephen Kalafut
(74) Attorney, Agent, or Firm—Jenkens & Gilchrist, a professional corporation

(57) ABSTRACT

A binder and/or electrolyte material and method for production thereof, which material is intended to be used in the preparation of a porous electrode (5) for a cell (100), wherein the binder and/or electrolyte material (20) comprises an ion conducting polymer (10).

23 Claims, 3 Drawing Sheets

Polymer Segments:

—Ethylene–Propylene Copolymer

—Norbornene Unit

—Hydroxylated Norbornene Unit

〜〜〜〜 —Poly(ethylene oxide)  $\{O\frown\}_n$

BINDER AND/OR ELECTROLYTE MATERIAL

This application claims priority under 35 U.S.C. §§119 and/or 365 to 9902233-7 filed in Sweden on Jun. 14, 1999; the entire content of which is hereby incorporated by reference.

FIELD OF THE INVENTION

The invention relates to a porous electrode for a battery, and more peculiarly, to a binder and/or electrolyte material for tie preparation of a porous electrode in a battery and to a porous electrode comprising such a binder and/or electrolyte material. The invention also relates to a method for the production of such a binder and/or electrolyte material.

BACKGROUND OF THE INVENTION

It is of great importance for electrodes that they have a high surface area resting in lower current densities, and consequently lower overvoltages for the electrode reactions. It has been found that this is obtained by employing porous electrodes.

Porous electrodes are currently used in many commercial batteries of today. This type of electrode brings several advantages, one of them being a large specific surface area. Another advantage is that the electrolyte is partly present in the porous structure, and hence higher limiting currents can be reached in short times, as compared to when a planar electrode is used. This is due to the outer limiting mass transport for the latter type of electrode.

The compactness of the porous electrode has a great impact on the ohmic potential drop because it determinates the distance through which the current flows. The latter effect is especially important when the battery is discharged/charged at high rates. High rates often lead to severe transport limitations in the depth of the electrode, and consequently to a low utilisation of the active electrode material. To minimise the latter internal loss of electrode performance, it is of great importance that the conductivity in all of the components of the electrode is high, and that the internal contact between the electrode components is good.

In principal, the electrode preparation may consist of mixing the electrochemically active materials together with carbon black and a binder dissolved in an organic solvent, e.g. cyclo-hexane, to a homogenous slurry. The slurry is thereafter evenly spread on a current collector, for instance by means of a Doctor blade, or pressed directly on the current collector, e.g. an aluminium foil. Finally, the electrode is left to dry. An intercalation compound such as $LiMn_2O_4$, $LiCoO_2$ or $LiNiO_2$ is normally provided on the electrode if used as a cathode, and a carbonaceous material such as coke or graphite if used as an anode.

JP-A-53010032 describes an electrode containing a core material of a conductive porous material, e.g. a nickel screen and an active material layer e.g. of hydroxide powder, carbonyl nickel powder as a conductive material and a binder, e.g. of CMC ethyl cellulose or PVA, PVC. The electrode is intended to be used in an alkaline storage cell, to obtain low polarisation and long life time.

One problem is that most common binders consist of an olefinic thermoplastic rubber, such as EPDM or the like. However, polyolefins are very poor ion conductors, which is a serious disadvantage for this type of product. The low ion conductivity results in high ohmic drop over the depth of the electrode. Some parts of the electrode may be totally inaccessible for ions such as Li-ions due to blocking effects caused by the binder. These two factors may severely limit the overall performance of the battery cell. Therefore, carbon black is added to the binder in order to compensate for the low conductivity.

Another problem is that poor contact between different materials often occurs.

It should, therefore, be appreciated that there is a need for a binder and/or electrolyte material, an electrode and related method for producing the material, to solve these problems. The present invention fulfills this need.

SUMMARY OF THE INVENTION

The invention is embodied in a binder and/or electrolyte material being intended to be used in the preparation of a porous electrode for a battery cell, a porous electrode comprising such a material, and related method, for producing the martial, said binder and/or electrolyte material providing high ion conductivity and adhesiveness by incorporating ion conducting polymer segments and adhesive polymer segments into the binder martial of polymeric type.

This leads to higher ion conductivity and improved adhesive properties in a single binder and/or electrolyte material.

According to a preferred embodiment of the invention, the ion conducting segments comprise at least one poly(alkylene oxide), preferably poly(ethylene oxide).

The binder and/or electrolyte material according to one preferred embodiment of the invention comprises a modified copolymer or block copolymer having ion conducting segments and adhesive segments incorporated.

Advantageously, the ion conducting segments a linked to at least one epoxidisable polymer chain segment. If the copolymer is a block copolymer, the ion conducting segments are preferably lined to a poly-isoprene or polybutadiene chain of the block copolymer.

The electrode according to one embodiment of the invention comprises an electrochemically active material, such as an intercalation compound, or an insertion carbonaceous material, a binder and/or electrolyte of polymeric type, advantageously provided on a current collector, wherein the binder and/or electrolyte material comprises a polymer having ion conducting polymer segments incorporated, preferably a copolymer, wherein the ion conducting polymer segments are incorporated with adhesive polymer segments.

The invention is also embodied in a method for the production of a binder and/or electrolyte of polymeric material intended to be used in the preparation of a porous electrode for a battery, wherein a copolymer is modified by incorporating ion conducing polymer segments and adhesive polymer segments.

According to a preferred embodiment of the invention a suitable block copolymer of "star type" block having "chains" containing carbon-carbon double bonds, for example polyisopreneyl is employed, which are epoxidised and thereafter hydroxylated to obtain polymer segments carrying hydroxyl groups, which may be utilised as initiators for ethoxylation by at least one poly(akylene oxide) to obtain poly(alkylene oxide), preferably poly(ethylene oxide) chains, which are ion conductive.

According to another preferred embodiment of the invention, a suitable copolymer is EPDM.

High ion conductivity is combined with good adhesive properties in a single binder material, which will increase the cell performance as compared to conventional cells using EPDM/carbon black.

BRIEF DESCRIPTION OF THE DRAWINGS

For an understanding of the present invention and for further objects and advantages thereof, reference can now be made to the following description, taken in conjunction with the accompanying drawings, in which.

DETAILED DESCRIPTION OF THE INVENTION

Figure 1A:
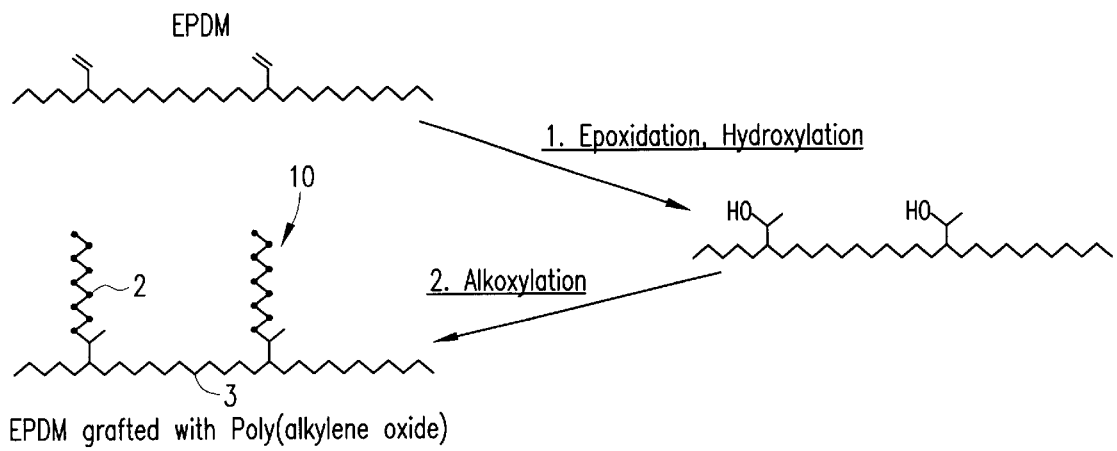
FIG. 1A is a diagrammatic reaction mechanism of the different steps involved in modification of EPDM, showing the incorporation of ion conducting polymer segments into the binder and/or electrode material, i.e. EPDM.

Thus, the invention concerns a binder and/or electrolyte material intended to be used in the preparation of a porous electrode for a battery, wherein the binder and/or electrolyte material comprises an ion conducting polymer 10, in the form of a modified copolymer having ion conducting polymer segments 2 and adhesive polymer segments 3 incorporated.

The ion conducting segments comprise at least on poly (alkylene oxid), preferably poly(ethylene oxide), poly (propylene oxide) and poly(tetramethylene oxide).

According to a preferred embodiment, the copolymer according to the invention is based on EPDM and the ion conducting segments 2 are linked to at least one epoxidisable polymer chain.

According to another preferred embodiment, the copolymer is a block copolymer and the ion conducting segments 2 are linked to at least one epoxidisable polymer chain which preferably is a poly-isoprene chain or a polybutadiene chain of the block copolymer. The block polymer may be based on polystyrene and polyolefins. One purpose to use polystyrene, is that polystyrene gives a more hard and stiff material.

The adhesive segments in the copolymer, according to the invention, are selected among polyolefins, such as polybutadiene, polyisoprene, EPDM (ethylene-propylene diene monomer) copolymers and EPR (ethylene propylene rubber) copolymers. The polyolefins may comprise double bonds. Examples of such polyolefins are polybutadiene, polyisoprene, partially hydrogenised polybutadiene, partially hydrogenised polyisoprene and propylene-ethylene-diene copolymers (EPDM). Olefins without double bonds could also be used as adhesive polymer segments and such examples are completely hydrogenised polybutadiene, completely hydrogenised polyisoprene and propylene-ethylene copolymers (EPR).

The double bonds may be modified, for example via epoxidation, hydroxylation and ethoxilation to include ion conducting segments into the polymer.

The invention also concerns an electrode intended to be used in a cell, said electrode comprising electrochemically active material, a binder and/or electrolyte material of polymeric type, an intercalation compound or a carbonaceous material, said provided on a current collector, wherein the binder and/or electrolyte material comprises a polymer having ion conducting polymer, in the form of a modified copolymer having ion conducing polymer segments and adhesive polymer segments incorporated.

The polymeric material according to the invention works both as a binder and/or an electrolyte material. Since the copolymer is ion conducting, it conducts ions between the anode and the cathode and may also at the same time, work as a separator between the electrodes.

The material also attach effectively to the active electrode materials, e.g. particles of graphite (anode material) and $LiMn_2O_4$, $LiNiO_2$, $LiCoO_2$ (cathode material), thereby binding them together to produce a mechanically very stable electrode. The excellent adhesion of the binder prevents leakage of the binder material out into the electrolytic membrane/separator.

The polymeric material in the binder and/or the electrolyte material have the properties good ion conductivity and good adhesiveness in the same material. No additives are necessary, such as carbon black, to enhance the electronic contact.

According to the invention, a method for the production of a binder and/or electrolyte material of polymeric material intended to be used in the preparation of a porous electrode for a cell, wherein a copolymer is modified by incorporation ion conducing polymer segments 2 and adhesive polymer segments 3, is also concerned The method comprises the steps of:
- epoxidising carbon-carbon double bonds in the copolymer, preferably comprising at least one unit having carbon-carbon double bonds, such as an isoprene or butadiene unit, or EPDM;
- hidroxylating the epoxidised bonds to obtain polymer segment 2 having hydroxyl groups;
- polymerising the poly(alkylene oxide), preferably poly (ethylene oxide) to graft the polymer segments having hydroxyl bonds with poly(alkylene oxide).

Figure 1B:
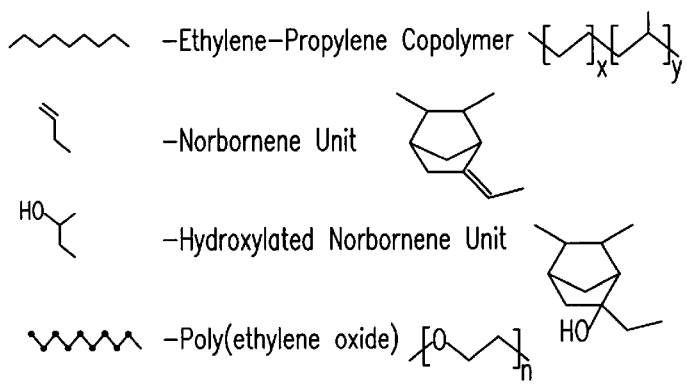
FIG. 1B illustrates different polymer segments, employed in FIG. 1A
Figure 1C:
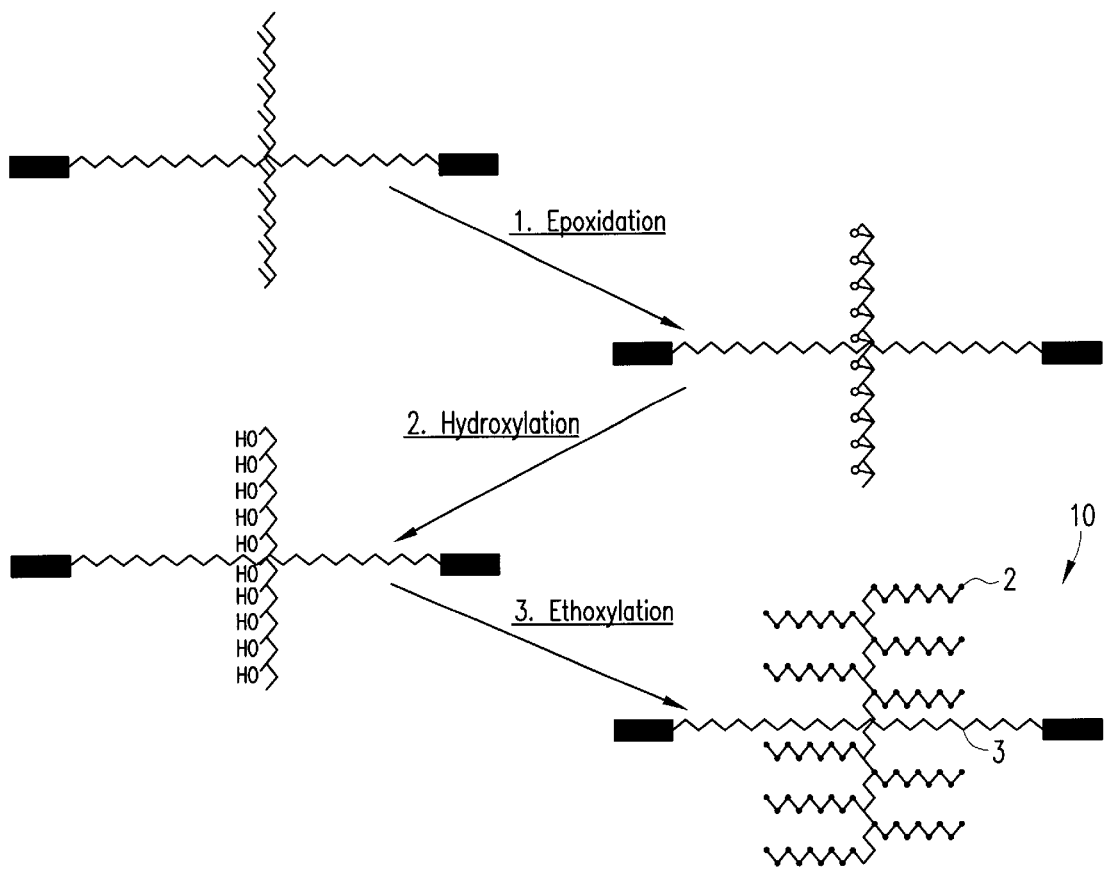
FIG. 1C is a diagrammatic reaction mechanism of the different steps involved in modification of a block copolymer, showing the incorporation of ion conducting polymer segments into the binder and/or electrode material.

Turning now to FIGS. 1A and 1C, there is shown diagrammatically the different reaction steps involved in a method for producing an ion conducting binder and/or electrolyte material, by modification of EPDM (FIG. 1A) or a block copolymer FIG. 1C), showing the incorporation of ion conducting polymer segments into the binder and/or electrolyte material, said material being intended to be used in the preparation of a porous electrode for a battery cell.

Figure 1D:
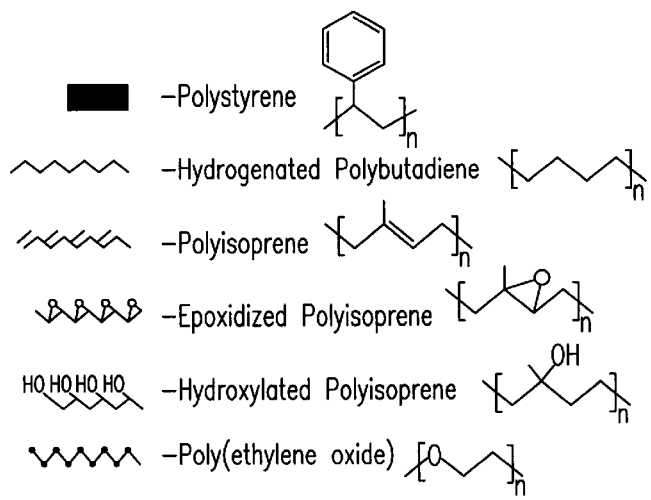
FIG. 1D illustrates different polymer segments, employed in FIG. 1C.

FIG. 1B and FIG. 1D shows the different polymer segments used in FIG. 1A and FIG. 1C. The poly(ethylene oxide) group is the ion conducting part in FIG. 1A, and clarified in FIG. 1B. The ethylene-propylene copolymer, the norbornene unit and the hydroxylated norbornene unit is also shown for clarifying the copolymer in FIG. 1A. The adhesive segment 3, is the ethylene propylene copolymer part in FIG. 1A and FIG. 1B, and the hydrogenated polybutadiene part in FIG. 1C and FIG. 1D.

As shown in FIG. 1C, the binder and/or electrolyte material according to a preferred embodiment of the invention, comprises an ion conducting polymer 10, which in this case is a modified block copolymer having ion conducting segments 2 and adhesive segments 3 incorporated. The ion conducting segments 2 comprise at least one polyalkylene oxide, such as poly(ethylene oxide), poly (propylene oxide) and poly(tetramethylene oxide) etc. Alternatively, the ion conducting segment 2 can be any other suitable ion conduct polymer, which can be incorporated into a block copolymer. The adhesive segments 3 are hydrogenated polybutadiene segments.

The production of the ion conducting binder material according to the invention is shown in FIG. 1C. A suitable block copolymer comprising carbon-carbon double bonds, for instance a block polymer based on polystyrene and polyolefins, provided with at least one isoprene chain, is modified by the following reaction steps:

epoxidising the carbon-carbon double bonds by means of a conventional method which will not be described in more detail;

hydroxylating the epoxidised bonds by means of a conventional method, to obtain polymer segments having hydroxyl groups;

polymerising a poly(alkylene oxide), preferably poly(ethylene oxide) to graft the polymer segments having hydroxyl bonds with poly(alkylene oxide).

The poly(alkylene oxide) can be e.g. poly(ethylene oxide), poly(propylene oxide) and poly(tetramethylene oxide), or copolymers thereof.

Poly(ethylene oxides) of low medium molecular mass M<800, or high mass>20000 can be employed.

FIG. 1A shows another embodiment of the invention, wherein the binder and/or electrolyte material according to the invention comprises a modified copolymer, which in FIG. 1A is EPDM, The ion conducting segments 2 are poly(ethylene oxide) groups and the adhesive segments 3 are ethylene-propylene copolymer parts.

A cell comprising electrodes which employs the binder and/or electrolyte material according to the invention is manufactured in any conventional way. In "Rechargeable batteries", Bruno Scrosati, Modern Batteries $2^{nd}$ ed, p 220, chapter 7 (1997) is a process of manufacturing cells shown as well as in U.S. Pat. No. 5,443,601.

Hereby follows an Example showing ion conductivity of polymers according to the invention.

EXAMPLE

The example describes the preparation of a binder material consisting of a starblock copolymer grafted with poly(ethylene oxide) (PEO), as well as characterization of its electrochemical properties. The starting material used was a four-arm starblock copolymer consisting of two polyisopreneyl (PI) arms, and two arms having inner blocks of hydrogenated polybutadiene (hPBd) and outer blocks of polystyrene (PS) (Kraton GRP from Shell Chemicals Inc.). The polymer was found by $^1$H NMR to contain 22, 21, and 57 wt % of PS, PI, and hPBd, respectively. The principal steps are shown in FIG. 1C.

The first step in the preparation of the grafted starblock copolymer involved epoxidation of the PI double bonds. To 10 g copolymer in 100 ml methylene chloride was charged 8.70 g of 3-chloroperbenzoic acid under stirring. After refluxing the solution for 8 h, it was allowed to cool to ambient temperature. The epoxidized polymer was precipitated in methanol from the reaction mixture, followed by repetitive precipitations in methanol from toluene solutions. Finally, it was dried under vacuum.

The second step was a reduction of the epoxidized PI arms. A 10% excess of LiAlH$_4$ was added to the epoxidized polymer dissolved in tetrahydrofuran. After refluxing for 4 h, hydrochloric acid was added to the solution to decompose excess hydride. The resulting hydroxylated polymer was precipitated from the reaction mixture in methanol, The polymer was carefully purified by successive precipitations in methanol from tetrahydrofuran solutions, and finally dried under vacuum.

The third step was to graft the starblock copolymer with PEO by using the hydroxylated PI arms as macroinitiators for anionic polymerization of ethylene oxide (EO). A pressure-sustaining 200 ml reactor equipped with a stirred, a gas inlet/outlet, a thermistor, and a pressure trnsducer was used in the grafting reactions. The reactor was first charged with 5 g of the hydroxylated polymer dissolved in 90 ml of a 2-ethoxyethyl ether/toluene (60/40) mixture. After degassing, 0.5 g of sodium hydride was added under stirring at ambient temperature. After 1 h, a 50 ml glass vessel containing 10 g EO was connected to the gas inlet/outlet of the reactor, and it was again degassed. The EO was thereafter transferred to the reactor by vacuum distillation, and the mixture was subsequently heated to 80° C. The grafting procedure was allowed to proceed until all the EO in the reactor had been consumed, that is, until the pressure had dropped to a constant pressure. The reaction mixture was then cooled, carefully degassed, and kept at 8° C. until the product was purified. The grafted polymer was precipitated from the reaction mixture, and repetitively washed with hexane. After drying, the polymer was leached with methanol. The purity was finally checked by GPC after drying in vacuum at ambient temperature.

The final step was to cap the terminal PEO graft chain ends with ethoxy units. The PEO chain ends were first ionized in tetrahydrofuran solution using sodium hydride. A 10% excess of bromoethane was thereafter introduced. The reaction was allowed to take place over 24 h at ambient temperature.

The compositions of the copolymers were calculated by integration and comparison of characteristic $^1$H NMR signals. The final PEO grafted starblock copolymer was thus found to contain 44 wt % hydrogenated butadiene, 22 wt % ethylene oxide, 16 wt % isoprene residues, and 18 wt % styrene.

Electrolytes of the grafted starblock copolymer were prepared by casting films containing lithium bis(trifluoromethylsulfonyl)imide (LiTFSI) salt. All components were carefully dried, and the electrolytes were prepared in an Ar-filled glove box. Various amounts of dimethoxyPEO ($M_n$=500 g/mol) were dissolved in distilled tetrahydrofuran together with PEO grafted starblock copolymer and LiTFSI. The salt concentration was kept at an (ether oxygen)-to-(Li ion) ratio of 20. The ion conductivity of the electrolytes was evaluated by measuring the temperature dependence of impedance spectra in the temperature range −10 to 100° C. Samples with diameters of 10–18 mm and a thickness of 100–600 μm were sandwiched between two gold-plated stainless steel blocking electrodes. The measurements were carried out using a computer controlled Novocontrol BDC40 high resolution dielectric analyzer equipped with a Novocool cyostat unit.

Figure 2:
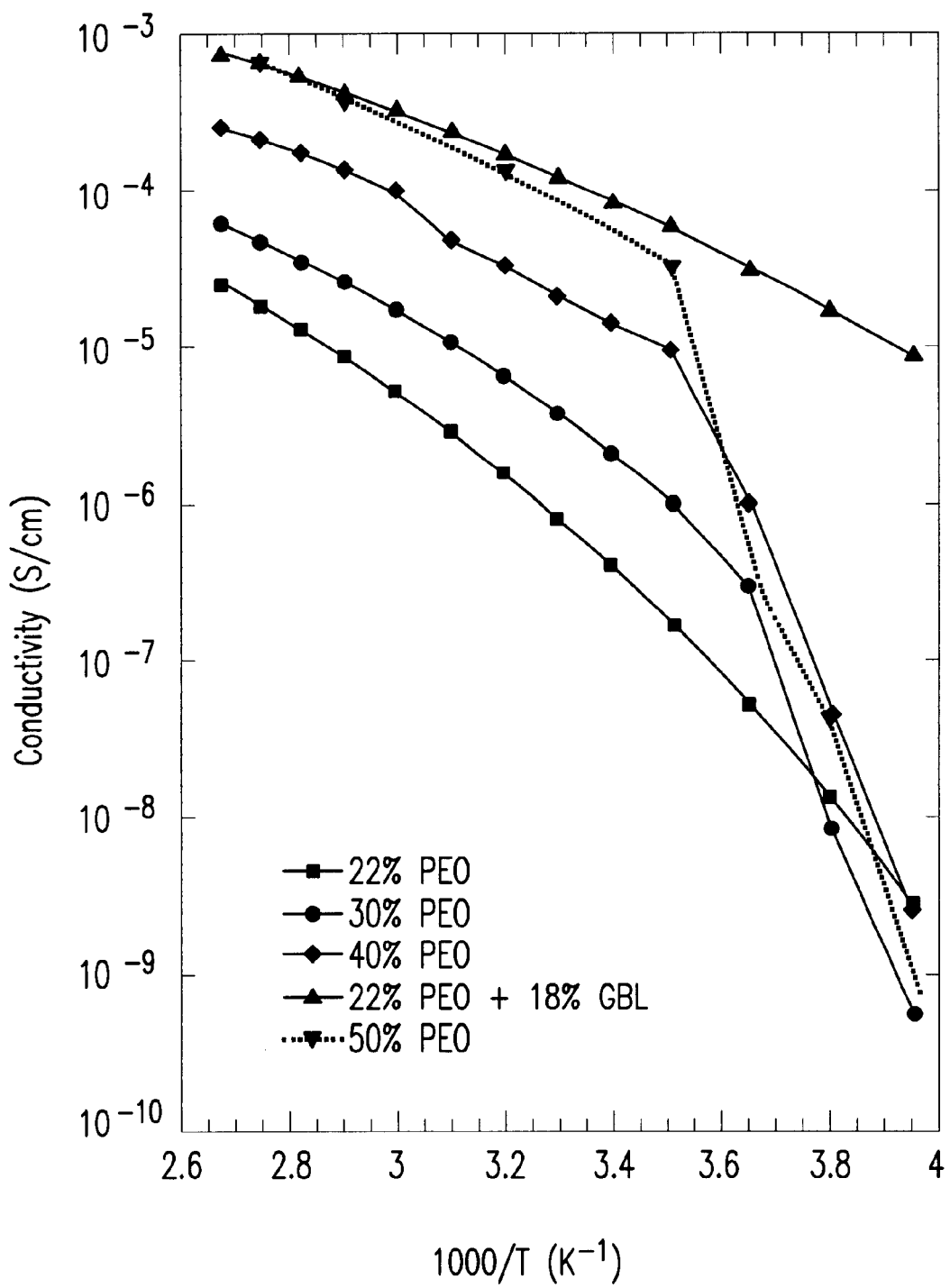
FIG. 2 shows the ion conductivity of a film containing a PEO grafted copolymer according to the Example.

FIG. 2 shows the ion conductivity of a 2-component film containing the PEO grafted copolymer and LiTFSI salt (22 wt % EO units), and three 3-component films containing the PEO grafted starblock copolymer, LiTFSI, and different amounts of dimethoxy PEO (30–50 wt % EO units). All the films were tacky, rubbery, free-standing, and showed an excellent adherence to glass and metal surfaces. As seen from the results, the ion conductivity can be improved by the addition of the dimethoxy PEO. The purpose of this addition was to create voids in the binder material in which ion conducting material, e.g. solutions or polymers, can be incorporated. If for example the binder material is to be used in a battery cell with a gel electrolyte, electrolyte solution (consisting of plasticizer and salt) can advantageously be added instead of the dimethoxyPEO in the preparation of the electrodes.

This is shown in FIG. 2 (22% PEO+18% GBL), were the conductivity for of a 3-component film consisting of the grafted copolymer, LiTFSI salt, and γ-butyrolactone (GBL, 18 wt %) plasticiser.

An alternative way to increase the ion conductivity is to increase the amount of PEO in the grafted starblock copolymer. The contents of PEO in the grafted starblock copolymers can be increased by increasing the of EO monomer addition during the grafting process. However, increasing the amount of PEO is likely to reduce the mechanical strength of the material.

The grafted starblock copolymer contains polymeric segments of PEO, polystyrene, and saturted polyolefins. All these constituents have in different contexts been previously evaluated and used as binder materials in electrodes for batteries. For example, galvanostatic cycling tests with electrochemical cells containing carbon based anodes with PEO as a binder material has been conducted by Doeff et al. in U.S. Pat. No. 5,443,601. A, Marca M. Doeff et al. (1995), demonstrating good reversibility and thereby, good electrochemical stability. In addition, to exemplify the electrochemical stability of EPDM, A. M. Andersson et al., demonstrated excellent reversible intercalation for graphite electrodes (90 wt % graphite. Timerex KS6, 5 wt % Shewinigan Black carbon, and 5 wt % EPDM) measured at a rate of C/2 shown in A. M. Andersson, K. Edström, J. O. Thomas, *J. Power Sources*, 81–82, 8, (1999) and A. M. Andersson, K. Edström, N. Rao, Å. Wendsjö, *J. Power Sources*, 81–82, 286, (1999)

The example shows that the polymer according to the invention shows good ion conductivity and good adherence.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as being within the scope of the present invention.

What is claimed is:

1. A binder or electrolyte material used in the preparation of a porous electrode for a battery, wherein the binder or electrolyte material comprises an ion conducting polymer in the form of a modified copolymer having ion conducting polymer segments and adhesive polymer segments wherein said adhesive polymer segments are adhesive polyolefin segments.

2. A binder or electrolyte material according to claim 1, wherein the ion conducting segments comprise at least one poly(alkylene oxide).

3. A binder or electrolyte material according to claim 2, wherein the poly(alkylene oxide) is poly(ethylene oxide), poly(propylene oxide) or poly(tetramethylene oxide).

4. A binder or electrolyte material according to claim 1, wherein the copolymer is based on EPDM.

5. A binder or electrolyte material according to claim 4, wherein the ion conducting segments are linked to at least one epoxidizable polymer chain.

6. A binder or electrolyte material according to claim 1, wherein the copolymer is a block copolymer and said ion conducting segments are linked to at least one epoxidizable polymer chain.

7. A binder or electrolyte material according to claim 6, wherein the epoxidizable polymer chain is a poly-isoprene chain or a polybutadiene chain of the block copolymer.

8. A binder or electrolyte material according to claim 6, wherein the block copolymer is based on polystyrene and polyolefins.

9. A binder or electrolyte material according to claim 8, wherein the adhesive polymer segments are polybutadiene, polyisoprene, EPDM copolymers or EPR copolymers.

10. An electrode intended to be used in a cell, said electrode comprising electrochemically active material, a binder or electrolyte material of polymeric type, an intercalation compound or a carbonaceous material, said electrode provided on a current collector, wherein the binder or electrolyte material comprises a polymer in the form of a modified copolymer having ion conducting polymer segments and adhesive polymer segments, wherein the adhesive polymer segments are polyolefins.

11. An electrode according to claim 10, wherein the ion conducting polymer segments comprise at least one poly(alkylene oxide).

12. An electrode according to claim 11, wherein the poly(alkylene oxide) is poly(ethylene oxide), poly(propylene oxide) or poly(tetramethylene oxide).

13. An electrode according to claim 10, wherein the modified copolymer is based on EPDM.

14. An electrode according to claim 13, wherein the ion conducting segments are linked to at least one epoxidizable polymer chain.

15. An electrode according to claim 10, wherein the copolymer is a block copolymer and is based on polystyrene and polyolefins.

16. An electrode according to claim 15, wherein the block copolymer is provided with at least one polyisopreneyl chain or polybutadiene chain, on to which the ion conducting polymer is grafted.

17. An electrode according to claim 10, herein said adhesive polymer segments are selected from the group consisting of polybutadiene, polyisopreneyl, EPDM copolymers and EPR copolymers.

18. A method for the production of a binder or electrolyte material of polymeric material intended to be used in the preparation of a porous electrode for a cell, wherein said method comprises modifying a copolymer to incorporate ion conducting polymer segments that comprise adhesive polymer segments, and wherein the adhesive polymer segments are polyolefins.

19. A method according to claim 18, wherein the ion conducting segments comprise poly(alkylene oxide).

20. A method according to claim 19, wherein the modification comprises the steps of:
   epoxidizing carbon-carbon double bonds in the copolymer, comprising at least one unit having carbon-carbon double bonds;
   hydroxylating the epoxidized bonds to obtain polymer segments having hydroxyl groups; and,
   polymerizing the poly(alkylene oxide) to graft the polymer segments having hydroxyl bonds with poly(alkylenoxide).

21. A method according to claim 19, wherein the units having carbon-carbon double bonds, are isoprene or butadiene units, or EPDM.

22. A method according to claim 19, wherein the poly(alkylene oxide) is poly(ethylene oxide).

23. A method according to claim 19, characterized in that the copolymer is a block copolymer.

* * * * *

UNITED STATES PATENT AND TRADEMARK OFFICE
CERTIFICATE OF CORRECTION

PATENT NO. : 6,465,126 B1
DATED : October 15, 2002
INVENTOR(S) : Jannasch et al.

It is certified that error appears in the above-identified patent and that said Letters Patent is hereby corrected as shown below:

Column 1,
Line 11, replace "more peculiarly," with -- more particularly, --
Line 12, replace "for tie preparation" with -- for the preparation --
Line 20, replace "area resting in" with -- area resulting in --

Column 2,
Line 18, replace "the martial," with -- the material, --
Line 21, replace "binder martial of" with -- binder material of --
Line 32, replace "segments a linked" with -- segments are linked --
Line 35, replace "preferably lined to" with -- preferably linked to --
Line 50, replace "conducing polymer" with -- conducting polymer --
Line 55, replace "polyisopreneyl" with -- polyisoprene --
Line 58, replace "one poly (akylene oxide)" with -- one poly (alkylene oxide) --

Column 4,
Lines 4 and 26, replace "conducing polymer" with -- conducting polymer --
Line 34, replace "hidroxylating" with -- hydroxylating --
Line 35, replace "segment 2" with -- segments 2 --
Line 65, replace "ion conduct polymer," with -- ion conducting polymer, --

Column 5,
Line 18, replace "copolymers" with -- co-polymers --
Lines 40-41, replace "polyisopreneyl" with -- polyisoprene --

Column 6,
Line 2, replace "stirred" with -- stirrer --
Line 3, replace "a pressure trnsducer" with -- a pressure transducer --

UNITED STATES PATENT AND TRADEMARK OFFICE
CERTIFICATE OF CORRECTION

PATENT NO. : 6,465,126 B1
DATED : October 15, 2002
INVENTOR(S) : Jannasch et al.

It is certified that error appears in the above-identified patent and that said Letters Patent is hereby corrected as shown below:

Column 7,
Line 11, replace "saturted" with -- saturated --
Line 22, replace "Timerex" with -- Timrex --

Column 8,
Line 29, replace "polyisopreneyl" with -- polyisoprene --

Signed and Sealed this

First Day of April, 2003

JAMES E. ROGAN
*Director of the United States Patent and Trademark Office*